United States Patent
Fukui et al.

(10) Patent No.: US 7,274,942 B2
(45) Date of Patent: *Sep. 25, 2007

(54) SYSTEM AND METHOD FOR PROVIDING INFORMATION TO A PORTABLE TERMINAL

(75) Inventors: Yoshiki Fukui, Suwa (JP); Shinya Taniguchi, Suwa (JP); Naruhide Kitada, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/395,248

(22) Filed: Apr. 3, 2006

(65) Prior Publication Data

US 2006/0189314 A1    Aug. 24, 2006

Related U.S. Application Data

(62) Division of application No. 10/062,725, filed on Feb. 5, 2002, now Pat. No. 7,050,816.

(30) Foreign Application Priority Data

Feb. 9, 2001 (JP) .............................. 2001-034351

(51) Int. Cl.
*H04Q 7/20* (2006.01)
(52) U.S. Cl. ............... 455/456.1; 455/414.1; 455/414.2; 455/432.1; 455/456.2; 455/456.3; 455/456.5; 455/456.6; 455/457; 455/552.1; 370/310; 709/218; 709/219; 709/227
(58) Field of Classification Search ............. 455/414.1, 455/414.2, 432.1, 456.1–457, 552.1; 370/310; 709/218, 219, 227

See application file for complete search history.

(56) References Cited

U.S. PATENT DOCUMENTS

| | | | |
|---|---|---|---|
| 6,042,383 A * | 3/2000 | Herron | 434/238 |
| 6,219,696 B1 | 4/2001 | Wynblatt et al. | |
| 6,256,498 B1 | 7/2001 | Ludwig | |
| 6,477,542 B1 * | 11/2002 | Papaioannou | 707/104.1 |
| 6,580,914 B1 | 6/2003 | Smith | |
| 6,677,894 B2 * | 1/2004 | Sheynblat et al. | 342/357.1 |
| 6,714,797 B1 | 3/2004 | Rautila | |
| 6,731,612 B1 | 5/2004 | Koss | |

FOREIGN PATENT DOCUMENTS

| | | |
|---|---|---|
| JP | A 09-153054 | 6/1997 |
| JP | A 10-243468 | 9/1998 |
| JP | A 11-115651 | 4/1999 |
| JP | A 11-187469 | 7/1999 |
| JP | A 11-250393 | 9/1999 |
| JP | A 2000-187667 | 7/2000 |

* cited by examiner

*Primary Examiner*—Steve M. D'Agosta
(74) *Attorney, Agent, or Firm*—Oliff & Berridge, PLC

(57) ABSTRACT

An information providing system can include a registration terminal having a guidance information registration database which stores information groups, which are correlated with reference position information. When portable terminal position information for specifying the position of a portable terminal is received together with a transmission request for the guidance information, the guidance information is automatically selected from an information group in accordance with the received transmission request on the basis of the position relationship between the reference position which is specified by the reference position information corresponding to the information group in accordance with the received transmission request, and the position which is specified by the received portable terminal position information, and the selected guidance information is transmitted to the portable terminal.

21 Claims, 8 Drawing Sheets

400 GUIDANCE INFORMATION MANAGING TABLE

| SERIAL NUMBER | DISPLAY TEXT | ORIGIN (x, y) | OVERVIEW INFORMATION | COVERAGE 1 [m] | GENERAL INFORMATION | COVERAGE 2 [m] | DETAILED INFORMATION | COVERAGE 3 [m] |
|---|---|---|---|---|---|---|---|---|
| 1 | TOKYO BAKERY, SETAGAYA-KU, TOKYO | (100, 100) | A1 | 10~100 | B1 | 5~10 | C1 | 0~5 |
| 2 | ELECTRICAL STORE, YOKOHAMA-SHI, KANAGAWA | (50, 50) | A2 | 100~200 | B2 | 50~100 | C2 | 0~50 |
| 3 | LAKE SUWA, SUWA, NAGANO | (100, 50) | A3 | 200~300 | B3 | 80~150 | C3 | 0~50 |
| n | ISHIWATA-ONSEN SPA, KOFU-SHI, YAMANASHI | (50, 100) | An | 150~400 | Bn | 100~150 | Cn | 20~100 |

| 402 | 404 | 406 | 408 | 410 | 412 | 414 | 416 | 418 |

FIG. 4

SYSTEM AND METHOD FOR PROVIDING INFORMATION TO A PORTABLE TERMINAL

This is a Divisional of application Ser. No. 10/062,725 filed Feb. 5, 2002 now U.S. Pat. No. 7,050,816. The entire disclosure of the prior application is hereby incorporate by reference herein in its entirety.

BACKGROUND OF THE INVENTION

1. Field of Invention

The present invention relates to a system that is capable of connecting a portable terminal with a registration terminal for registering target information via a network to provide the target information in the registration terminal to the portable terminal, and to a terminal for use in the same system. More particularly, the present invention relates to an information providing system, a registration terminal, and a portable terminal which are suitable for providing appropriate information depending upon the position of a user and for facilitating acquisition of information by the user.

2. Description of Related Art

Currently, information viewer systems, such as that disclosed in Japanese Unexamined Patent Application Publication No. 11-126184, are known as a system in which information is downloaded for use from a terminal connected to a network with such an information viewer system, when a storage medium owned by a user is connected to an information providing terminal device via storage medium connecting device, the information providing terminal device retrieves information from an information server via a network, and the retrieved information is transferred to and stored in the storage medium. By connecting the storage medium to an information display terminal device, the information stored in the storage medium can be displayed on the information display terminal device so as to be viewed by the user. Accordingly, a user is readily able to retrieve and view required information without the needs for explicit operation for selecting information.

However, in such a conventional information viewer system, which is adapted to provide information into uniformity, the same content of information could only be obtained in whatever condition a user downloads the same information, and it can be difficult to provide appropriate information in accordance with the circumstance of the user. For instance, it is assumed that shop or sightseeing guidance information is provided as part of information providing services. If a user far from the shop or sightseeing spot of interest uses a portable terminal to access the guidance information, simplified guidance information only about the outline of the shop or sightseeing spot may be provided. If a user near the shop or the sightseeing spot of interest uses a portable terminal to access it, detailed guidance information regarding the content or specific direction of the shop or sightseeing spot may be provided, thereby providing appropriate information depending upon the position of a user.

Like homepages on the Internet, simplified information may also be posted on a top page, followed by detailed information in a hierarchical manner, thereby allowing a user to obtain the information content desired by the user. However, if the desired information is placed in a deep hierarchy from the top page, a user must search for the information while viewing hierarchically ordered pages page by page from the top page, thereby wasting labor and time. In addition, access from a portable terminal such as a cellular phone may require repeated trial-and-error accesses, thereby making the communications costly.

Rather, it may also be contemplated that only detailed information be provided every time. However, in the case where sightseeing information is provided, as described above, detailed information may not be necessarily required sometimes depending upon the position of a user. The detailed information requires proportionally large capacity of data, resulting in undesirable communications load placed on a portable terminal if the information is not necessary to a user.

SUMMARY OF THE INVENTION

Accordingly, the present invention has been made in view of the foregoing unsolved problems associated with the conventional art, and it is an object of the present invention to provide an information providing system, a registration terminal, and a portable terminal which are desirable to assist a user in readily obtaining information.

To this end, an information providing system according to the present invention can connect a portable terminal with a registration terminal for registering target information which is to be used by the portable terminal, and provides the target information in the registration terminal to the portable terminal. The registration terminal can be adapted to associate a plurality of different pieces of the target information with a single information group, and to register the information group, which is correlated with reference position information for specifying a reference position as a reference. The target information in the registration terminal can be provided to the portable terminal by selecting the target information from the information group on the basis of the position relationship between the reference position which is specified by the reference position information corresponding to the information group, and the portable terminal, and by transmitting the selected target information to the portable terminal. With such a structure, in order to provide the target information in the registration terminal to the portable terminal, based on the position relationship between the reference position which is specified by the reference position information corresponding to an information group, and the portable terminal, the target information is selected from that information group, and the selected target information can be transmitted to the portable terminal.

In this regard, the determination of the position relationship may desirably, but not restrictively, be performed by one or both of the registration terminal and the portable terminal, and may also be performed by any other terminal than the registration terminal and the portable terminal.

The position of the portable terminal may be specified in detail using GPS (Global Positioning System), etc., on the basis of the position information from a base station with which the portable terminal or the portable terminal communicates, or may be roughly specified by determining whether or not the portable terminal belongs to the communications coverage of a particular base station on the basis of the position of the particular base station.

Furthermore, the position of the portable terminal may be specified as the relative position to the reference position, or as the absolute position using latitude and longitude, etc.

The registration terminal can be designed to store the target information by any technique at any time, and may store the target information beforehand, or may not store the target information beforehand but store the target information such as by an external input when the present apparatus is activated.

According to an information providing system of the present invention, the registration terminal can include a storage device for storing the information group, which is correlated with the reference position information, in which, when portable terminal position information for specifying the position of the portable terminal is received together with a transmission request for the target information, the target information can be selected from an information group in accordance with the received transmission request on the basis of the position relationship between the reference position which is specified by the reference position information corresponding to the information group in accordance with the received transmission request, and the position which is specified by the received portable terminal position information, and the selected target information is transmitted to the portable terminal. The portable terminal can include a position information retrieving device for retrieving the portable terminal position information, in which the portable terminal position information retrieved by the position information retrieving means is transmitted to the registration terminal together with the transmission request.

With this structure, in the portable terminal, the portable terminal position information can be retrieved by the position information retrieving device, and the retrieved portable terminal position information can be transmitted to the registration terminal together with the transmission request for the target information such as by user's operation.

In the registration terminal, when the portable terminal position information is received together with the transmission request, the target information can be selected from an information group in accordance with the received transmission request on the basis of the position relationship between the reference position which is specified by the reference position information corresponding to the information group in accordance with the received transmission request, and the position which is specified by the received portable terminal position information.

The storage device is designed to store the target information by any technique at any time, and may store the target information beforehand, or may not store the target information beforehand but store the target information by an external input when the present apparatus is activated.

According to an information providing system of the present invention, the registration terminal can include a storage device for storing the information group, which is correlated with the reference position information, in which, when a transmission request for the target information is received, reference position information corresponding to an information group in accordance with the received transmission request is transmitted to the portable terminal. When a result of determination by the portable terminal is received in response to the transmission of the reference position information, the target information is selected from an information group in accordance with the received transmission request on the basis of the received result of determination, and the selected target information is transmitted to the portable terminal. The portable terminal includes position information retrieving means for retrieving portable terminal position information for specifying the position of the portable terminal, in which, when the reference position information is received in response to the transmission of the transmission request, the position relationship between the reference position which is specified by the received reference position information, and the position which is specified by the portable terminal position information retrieved by the position information retrieving device is determined, and a result of the determination is transmitted to the registration terminal.

With this structure, in the portable terminal, the transmission request for the target information can be transmitted to the registration terminal such as by user's operation.

In the registration terminal, when the transmission request is received, the reference position information corresponding to an information group in accordance with the received transmission request can be transmitted to the portable terminal.

In the portable terminal, the portable terminal position information can be retrieved by the position information retrieving device. When the reference position information is received, the position relationship between the reference position which is specified by the received reference position information, and the position which is specified by the retrieved portable terminal position information can be determined, and a result of the determination can be transmitted to the registration terminal.

In the registration terminal, when the result of the determination is received, the target information can be selected from an information group in accordance with the received transmission request on the basis of the received result of the determination, and the selected target information can be transmitted to the portable terminal.

According to an information providing system of the present invention, the registration terminal can include a storage device for storing the information group, which is correlated with the reference position information, in which, when a transmission request for the target information is received, an information group in accordance with the received transmission request, and the reference position information corresponding thereto are transmitted to the portable terminal. The portable terminal includes a position information retrieving device for retrieving portable terminal position information for specifying the position of the portable terminal, in which, when the information group and the reference position information are received in response to the transmission of the transmission request, the target information is selected from the received information group on the basis of the position relationship between the reference position which is specified by the received reference position information, and the position which is specified by the portable terminal position information retrieved by the position information retrieving device.

With this structure, in the portable terminal, the transmission request for the target information can be transmitted to the registration terminal such as by user's operation.

In the registration terminal, when the transmission request is received, an information group in accordance with the received transmission request, and the reference position information corresponding thereto can be transmitted to the portable terminal.

In the portable terminal, the portable terminal position information can be retrieved by the position information retrieving device. When the information group and the reference position information is received, the target information can be selected from the received information group on the basis of the position relationship between the reference position which is specified by the received reference position information, and the position which is specified by the retrieved portable terminal position information.

According to an information providing system of the present invention, the registration terminal can include a storage device for storing the information group, which is correlated with the reference position information, and for storing program data, in which, when a transmission request for the target information is received, an information group in accordance with the received transmission request, the reference position information corresponding thereto, and the program data are transmitted to the portable terminal. The program data is program data which causes the portable terminal to execute the process of selecting the target information from the information group on the basis of the position relationship between the reference position which is specified by the reference position information, and the position which is specified by portable terminal position information for specifying the position of the portable terminal. The portable terminal can include a position information retrieving device for retrieving the portable terminal position information, in which, when the information group, the reference position information, and the program data are received in response to the transmission of the transmission request, the process is executed according to the received program data to select the target information.

With this structure, in the portable terminal, the transmission for the target information can be transmitted to the registration terminal such as by user's operation.

In the registration terminal, when the transmission request is received, an information in accordance with the received transmission request, the reference position information corresponding thereto, and a program data can be transmitted to the portable terminal.

In the portable terminal, the portable terminal position information can be retrieved by the position information retrieving device. When the information group, the reference position information, and the program data are received, the process is executed according to the received program data to thereby select the target information from the received information group on the basis of the position relationship between the reference position which is specified by the received reference position information, and the position which is specified by the retrieved portable terminal position information.

According to an information providing system of the present invention, the information group can include a first target information and a second target information having more detailed content than the first target information, which are associated with each other; and in the selection of the target information. The first target information can be selected from the information group if a distance from the reference position which is specified by the reference position information to the position which is specified by the portable terminal position information is within a first predetermined range. The second target information can be selected from the information group if a distance from the reference position which is specified by the reference position information to the position which is specified by the portable terminal position information is within a second predetermined range which is smaller than the first predetermined range.

With this structure, first target information can be selected if a distance from the position of the portable terminal to the reference position is within a first predetermined range. If the portable terminal is closer to the reference position, and a distance from the position of the portable terminal to the reference position is within a second predetermined range which is smaller than the first predetermined range, second target information having more detailed content than the first target information can be selected.

As used herein, a distance from the position of the portable terminal to the reference position is not limited on the slant distance between the position of the portable terminal and the reference position, and may encompass the distance across paths (for example, road, railroad line, flight path, sailing path, etc.) extending from the position of the portable terminal to the reference position.

According to an information providing system of the present invention, the information group can include first target information and second target information that has more detailed content than the first target information in addition to the content of the first target information, which are associated with each other. In the selection of the target information, the first target information is selected from the information group if a distance from the reference position which is specified by the reference position information to the position which is specified by the portable terminal position information is within a first predetermined range. The second target information is selected from the information group if a distance from the reference position which is specified by the reference position information to the position which is specified by the portable terminal position information is within a second predetermined range which is smaller than the first predetermined range.

With this structure, first target information can be selected if a distance from the position of the portable terminal to the reference position is within a first predetermined range. If the portable terminal is closer to the reference position, and a distance from the position of the portable terminal to the reference position is within a second predetermined range which is smaller than the first predetermined range, second target information that has more detailed content than the first target information in addition to the content of the first target information can be selected.

According to an information providing system of the present invention, the registration terminal can be connected with an external terminal having the target information registered therein. The system can include a target information retrieving device for retrieving the target information from the external terminal and the target information retrieved by the target information retrieving means is stored in the storage device. With this structure, in the registration terminal, the target information can be retrieved by the target information retrieving device from an external terminal, and the retrieved target information can be stored in the storage device.

Furthermore, to this end, a registration terminal according to the present invention, which is connected with the portable terminal in the above-described information providing system, can include a storage device for storing the information group, which is correlated with the reference position information. When the portable terminal position information is received together with the transmission request, the target information is selected from an information group in accordance with the received transmission request on the basis of the position relationship between the reference position which is specified by the reference position information corresponding to the information group in accordance with the received transmission request, and the position which is specified by the received portable terminal position information, and the selected target information is transmitted to the portable terminal.

A registration terminal of the present invention, which is connected with the portable terminal in the above-described information providing system, can include a storage device for storing the information group, which is correlated with the reference position information. When the transmission request is received, the reference position information corresponding to an information group in accordance with the received transmission request is transmitted to the portable terminal, and, when the result of the determination is received in response to the transmission of the reference position information, the target information is selected from the information group in accordance with the received transmission request on the basis of the received result of the determination, and the selected target information is transmitted to the portable terminal.

A registration terminal of the present invention, which is connected with the portable terminal in the above-described information providing system, can include a storage device for storing the information group, which is correlated with the reference position information, and for storing the program data. When the transmission request is received, an information group in accordance with the received transmission request, the reference position information corresponding thereto, and the program data are transmitted to the portable terminal.

Furthermore, to this end, a portable terminal according to the present invention, which is communicatably connected with the above-described registration terminal in the information providing system, can include a position information retrieving device for retrieving the portable terminal position information. When the reference position information is received in response to the transmission of the transmission request, the position relationship between the reference position which is specified by the received reference position information, and the position which is specified by the portable terminal position information retrieved by the position information retrieving device is determined, and a result of the determination is transmitted to the registration terminal.

Furthermore, to this end, a portable terminal of the present invention, which is connected with the above-described registration terminal in the information providing system, can include a position information retrieving device for retrieving the portable terminal position information. When the information group and the reference position information are received in response to the transmission of the transmission request, the target information is selected from the received information group on the basis of the position relationship between the reference position which is specified by the received reference position information, and the position which is specified by the portable terminal position information retrieved by the position information retrieving means.

In the foregoing description, an information providing system, a registration terminal, and a portable terminal which are provided to achieve the foregoing object have been proposed. However, it should be understood that the present invention is not limited thereto, and first and second storage media as described below may be proposed to achieve the foregoing object.

A first storage medium can be a computer-readable storage medium which stores a program which is applied to a registration terminal communicatably connected with a portable terminal in the above-described information providing system. The program which causes a computer having storage device for storing the information group, which is correlated with the reference position information, to, when the portable terminal position information is received together with the transmission request, execute the process of selecting the target information from an information group in accordance with the received transmission request on the basis of the position relationship between the reference position which is specified by the reference position information corresponding to the information group in accordance with the received transmission request, and the position which is specified by the received portable terminal position information, and of transmitting the selected the target information to the portable terminal.

With this structure, when the program stored in the storage medium is read by the computer, and the process is executed by the computer according to the read program, the advantage and effect equivalent to those of the above-described registration terminal in the information providing system set forth above.

A second storage medium can be a computer-readable storage medium which stores a program which is applied to a portable terminal communicatably connected with a registration terminal in the above-described information providing system. The program which causes a computer having position information retrieving device for retrieving the portable terminal position information to, when the reference position information is received in response to the transmission of the transmission request, execute the process of determining the position relationship between the reference position which is specified by the received reference position information, and the position which is specified by the portable terminal position information retrieved by the position information retrieving device, and of transmitting a result of the determination to the registration terminal.

With this structure, when the program stored in the storage medium is read by the computer, and the process is executed by the computer according to the read program, the advantage and effect equivalent to those of the above-described portable terminal in the information providing system set forth above.

BRIEF DESCRIPTION OF THE DRAWINGS

The invention will be described with reference to the accompanying drawings, wherein like numeral reference like elements, and wherein:

FIG. 4 is a view of the data structure of an exemplary guidance information managing table 400;

DETAILED DESCRIPTION OF PREFERRED EMBODIMENTS

Figure 1:
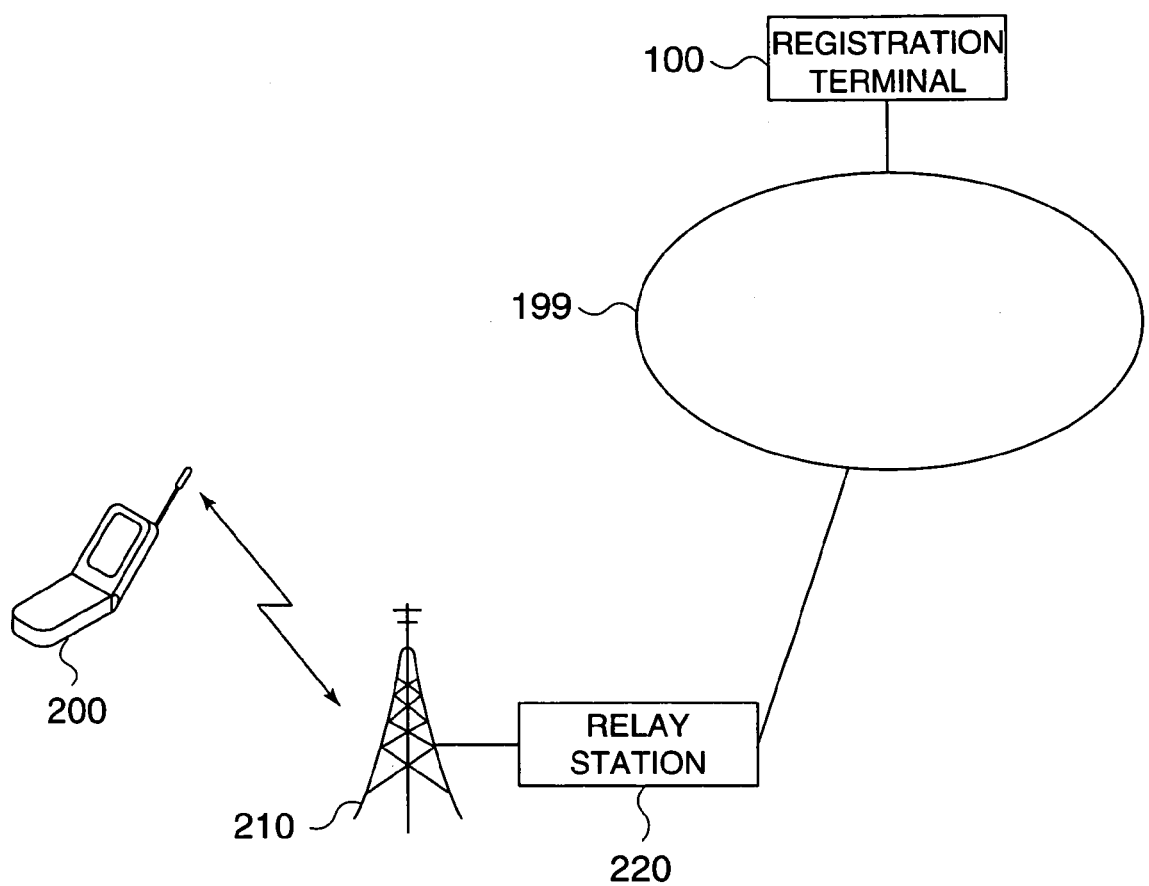
FIG. 1 is a block diagram of the structure of a network system incorporating the present invention.

An embodiment of the present invention will now be described with reference to the drawings. FIGS. 1 to 8 show an exemplary information providing system, a registration terminal, and a portable terminal according to an embodiment of the present invention. In the embodiment, an information providing system, a registration terminal, and a portable terminal in accordance with the present invention are implemented, as shown in FIG. 1, in the case where a registration terminal 100 for registering shop or sightseeing guidance information is connected to a portable terminal 200 via a network, where the guidance information is downloaded in the portable terminal 200 from the registration terminal 200.

First, the structure of a network system incorporating the present invention is described with reference to FIG. 1. FIG. 1 is an exemplary block diagram of the structure of a network system incorporating the present invention.

As shown in FIG. 1, a registration terminal 200 for registering guidance information, and a relay station 220 for relaying communications from/to a portable terminal 200 to/from the Internet 199 are linked to the Internet 199. Although only one portable terminal 200 is shown in FIG. 1 for facilitating the understanding of the present invention, a plurality of portable terminals 200 are actually linked to the Internet 199.

A plurality of base stations 210 for performing wireless communications to/from the portable terminal 200 are linked to the relay station 220. When the portable terminal 200 accesses the Internet 199, the relay station 220 serves as a terminal on the Internet 199, in place of the portable terminal 200, to transmit data from the portable terminal 200 which has been received via the base stations 210 to a destination terminal over the Internet 199 and to transmit data of a destination terminal on the Internet 199 to the portable terminal 200 via the base stations 210.

Figure 2:
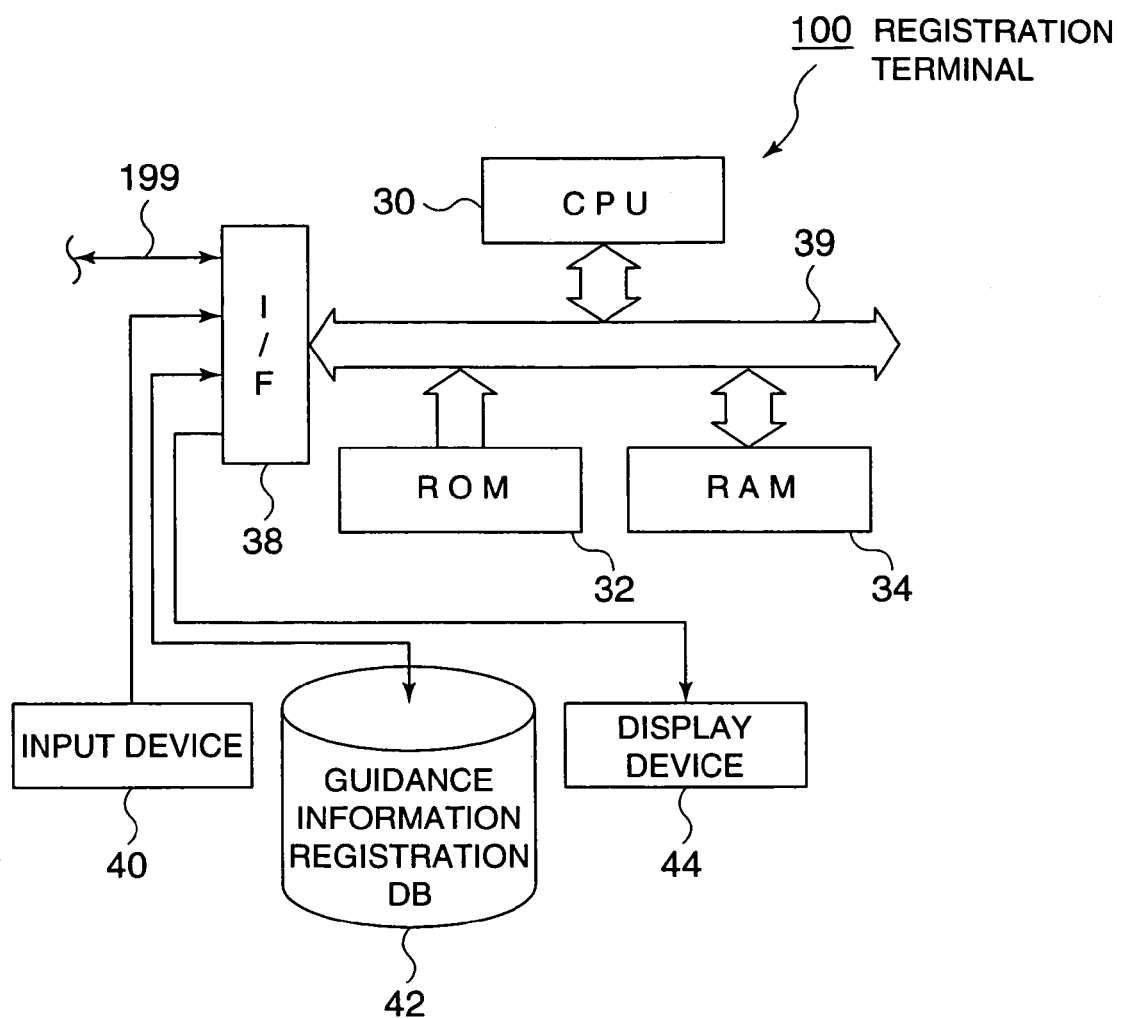
FIG. 2 is an exemplary block diagram of the structure of a registration terminal 100.

Then, the structure of the registration terminal 100 is described in detail with reference to FIG. 2. FIG. 2 is an exemplary block diagram of the structure of the registration terminal 100.

As shown in FIG. 2, the registration terminal 100 can include a CPU 30 which controls the calculation and the overall system according to a control program, a ROM 32 which stores the control program of the CPU 30 and the like in a predetermined region beforehand, a RAM 34 which stores the data read from the ROM 32 etc., and results of the required calculation in the calculation process by the CPU 30, and an I/F 38 which intermediates the input/output of data to/from an external device. These components are connected to each other so that data can be transmitted/received through a bus 39 serving as a signal line for data transfer.

Connected to the I/F 38 are external devices including an input device 40, such as a keyboard or a mouse, which allows for data input as a human interface, a guidance information registration database (a database is hereinafter abbreviated to "DB") 42, and a display device 44 for display on a screen based on an image signal.

Figure 3:
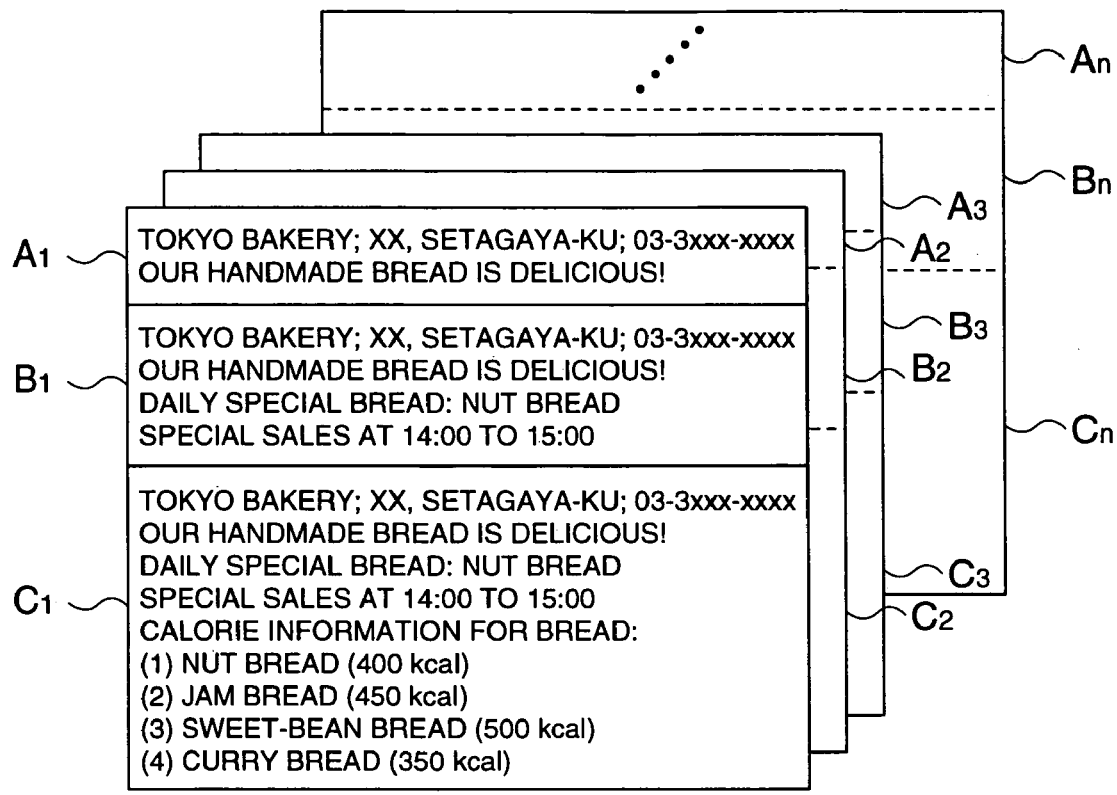
FIG. 3 is a view of the data structure of information groups.

The guidance information registration DB 42 stores a plurality of information groups, each including an associated combination of a plurality of different pieces of guidance information. FIG. 3 shows the data structure of an information group.

As shown in FIG. 3, each information group includes an associated combination of overview information A about the overview content of shops or sightseeing spots, general information B about the general content of shops or sightseeing spots which is more detailed than the overview information A, and detailed information C about the detailed content of shops or sightseeing spots which is more detailed than the general information B. The general information B has more detailed content than the overview information A in addition to the content of the overview information A, and the detailed information C has more detailed content than the general information B in addition to the general information B.

In the example shown in FIG. 3, a first information group indicates an associated combination of: "TOKYO BAKERY; XX, SETAGAYA-KU; 03-3xxx-xxxx; OUR HANDMADE BREAD IS DELICIOUS!" as overview information $A_1$; "DAILY SPECIAL BREAD, NUT BREAD; SPECIAL SALES AT 14:00 TO 15:00" as general information $B_1$ in addition to the content of the overview information $A_1$; and "CALORIE INFORMATION FOR BREAD, (1) NUT BREAD (400 kcal), (2) JAM BREAD (450 kcal), ..." as detailed information $C_1$ in addition to the content of the general information $B_1$.

As shown in FIG. 4, the guidance information registration DB 42 contains a guidance information managing table 400 in which reference position information for specifying the reference position of the guidance information, and the correlation between the guidance information and the reference position information are registered. FIG. 4 is a view of the data structure of the guidance information managing table 400.

As shown in FIG. 4, the guidance information managing table 400 is registered with a single record for each information group. Each record includes a field 402 having the serial number registered therein, a field 404 having a display text sentence registered therein which indicates the reference position, a field 406 having the coordinate of the reference position registered therein, a field 408 having the overview information A's file name registered therein, a field 410 having a coverage registered therein to which the overview information A is serviced, a field 412 having the general information B's file name registered therein, a field 414 having a coverage registered therein to which the general information B is serviced, a field 416 having the detailed information C's file name registered therein, and a field 418 having a coverage registered therein to which the detailed information C is serviced. In this regard, the data in the field 406 corresponds to the reference position information.

In the example shown in FIG. 4, a record at the first row in the figure is registered with "1" as the serial number in the field 402, "TOKYO BAKERY, SETAGAYA-KU, TOKYO" as display text in the field 404, "(100, 100)" as the coordinate of the reference position in the field 406, "$A_1$" as the overview information A's file name in the field 408, "10 to 100 [m]" as the overview information A service coverage in the field 410, "$B_1$" as the general information B's file name in the field 412, "5 to 10 [m]" as the general information B service coverage in the field 414, "$C_1$" as the detailed information C's file name in the field 416, and "0 to 5 [m]" as the detailed information C service coverage in the field 418. This means that, when the portable terminal 200 accesses the guidance information "TOKYO BAKERY, SETAGAYA-KU, TOKYO," then viewable on the portable terminal 200 is the overview information A having a file name, overview information $A_1$, if a distance from the portable terminal 200 to the reference position is within a range of 10 to 100 m; the general information B having a file name, general information $B_1$, if a distance from the portable terminal 200 to the reference position is within a range of 5 to 10 m; or the detailed information C having a file name, detailed information $C_1$, if a distance from the portable terminal 200 to the reference position is within a range of 0 to 5 m.

Figure 5:
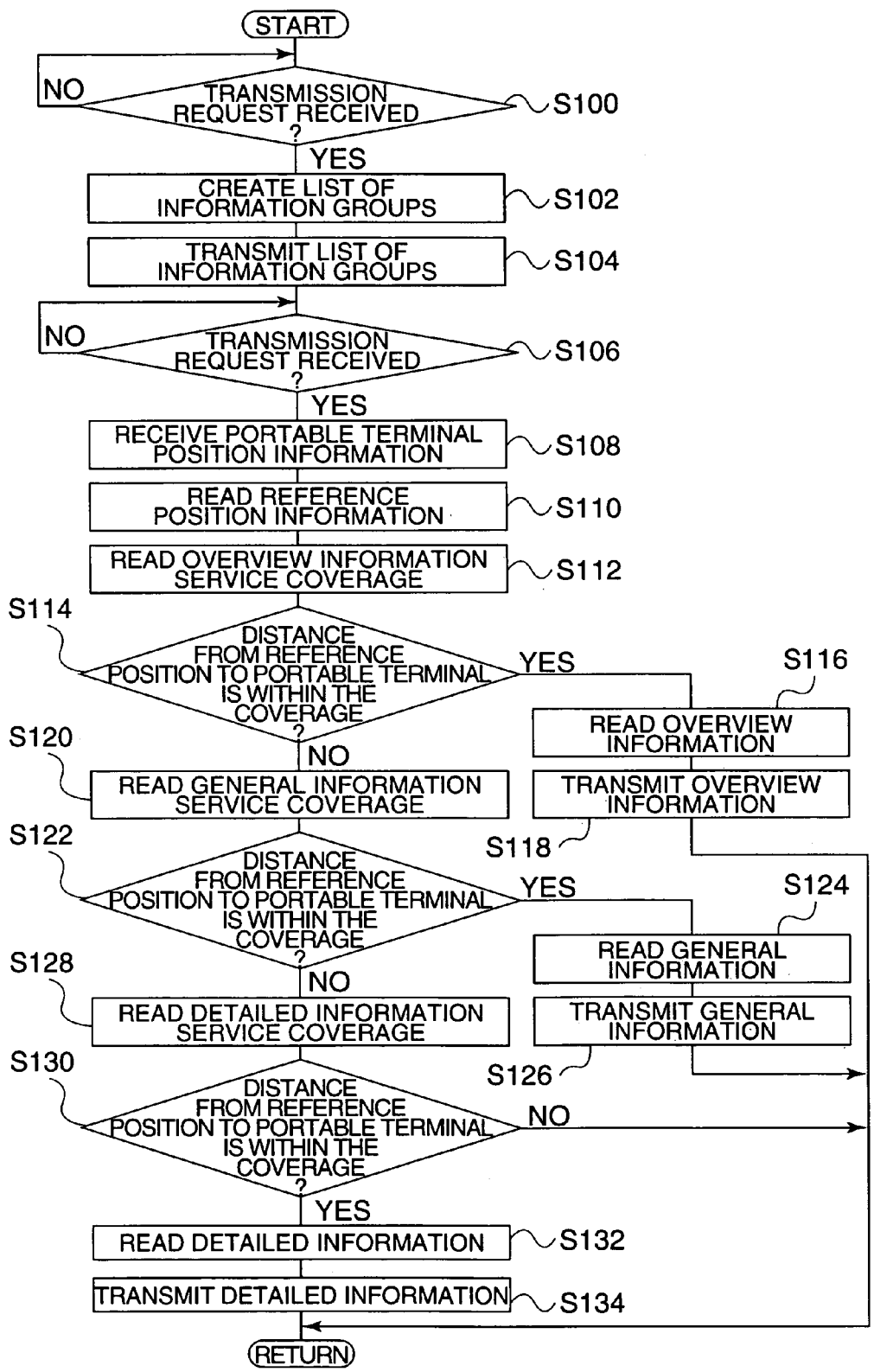
FIG. 5 is a flowchart of an exemplary guidance information providing process.

The CPU 30, such as a micro processing unit or MPU, activates a predetermined program stored in a predetermined region of the ROM 32 to perform the guidance information providing process shown in a flowchart of FIG. 5 according to the program. FIG. 5 is a flowchart of an exemplary guidance information providing process.

The guidance information providing process is a process of providing the guidance information in the guidance information registration DB 42 in response to a transmission request from the portable terminal 200, as shown in FIG. 5, first proceeding to step S100. At step S100, it is determined whether or not a transmission request for the guidance information has been received. If it is determined that the transmission request has been received (Yes), then the process proceeds to step S102, however, if it is determined otherwise (No), then the process waits at step S100 until the transmission request has been received.

At step S102, a list of information groups in the guidance information registration DB 42 is created, followed by step S104, where the resulting list of information groups is transmitted to the portable terminal 200. Then, the process proceeds to step S106.

At step S106, it is determined whether or not a transmission request for the guidance information based on the list of information groups has been received. If it is determined that the transmission request has been received (Yes), then the process proceeds to step S108, where portable terminal position information for specifying the position of the portable terminal 200 is received. Then, the process proceeds to step S110.

At step S110, the reference position information corresponding to an information group in accordance with the transmission request is read from the guidance information managing table 400, followed by step S112, where the overview information A service coverage for the information group in accordance with the transmission request is read from the guidance information managing table 400. Then, the process proceeds to step S114.

At step S114, it is determined whether or not a distance from the position which is specified by the received portable terminal position information to the reference position which is specified by the read reference position information is within the overview information A service coverage which has been read. If it is determined that a distance from the portable terminal 200 to the reference position is within the overview information A service coverage (Yes), the process proceeds to step S116, where the overview information A out of the information group in accordance with the overview information A is read from the guidance information registration DB 42, then proceeding to step S118, where the read overview information A is transmitted to the portable terminal 200. Then, the process completes the series of steps and returns to the initial processing.

On the other hand, if it is determined at step S114 that a distance from the portable terminal 200 to the reference position is not within the overview information A service coverage (No), then the process proceeds to step S120, where the general information B service coverage for the information group in accordance with the transmission request is read from the guidance information managing table 400. Then, the process proceeds to step S122.

At step S122, it is determined whether or not a distance from the position which is specified by the received portable terminal position information to the reference position which is specified by the read reference position information is within the general information B service coverage which has been read. If it is determined that a distance from the portable terminal 200 to the reference position is within the general information B service coverage (Yes), then the process proceeds to step S124, where the general information B out of the information group in accordance with the transmission request is read from the guidance information registration DB 42, then proceeding to step S126, where the read general information B is transmitted to the portable terminal 200. Then, the process completes the series of steps and returns to the initial processing.

On the other hand, if it is determined at step S122 that a distance from the portable terminal 200 to the reference position is not within the general information B service coverage (No), then the process proceeds to step S128, where the detailed information C service coverage for the information group in accordance with the transmission request is read from the guidance information managing table 400. Then, the process proceeds to step S130.

At step S130, it is determined whether or not a distance from the position which is specified by the received portable terminal position information to the reference position which is specified by the read reference position information is within the detailed information C service coverage which has been read. If it is determined that a distance from the portable terminal 200 to the reference position is within the detailed information C service coverage (Yes), then the process proceeds to step S132, where the detailed information C out of the information group in accordance with the transmission request is read from the guidance information registration DB 42, then proceeding to step S134, where the read detailed information C is transmitted to the portable terminal 200. Then, the process completes the series of steps and returns to the initial processing.

On the other hand, if it is determined at step S106 that the transmission request of the guidance information based on the list of information groups has not been received (No), then the process waits at step S106 until the transmission request has been received.

Figure 6:
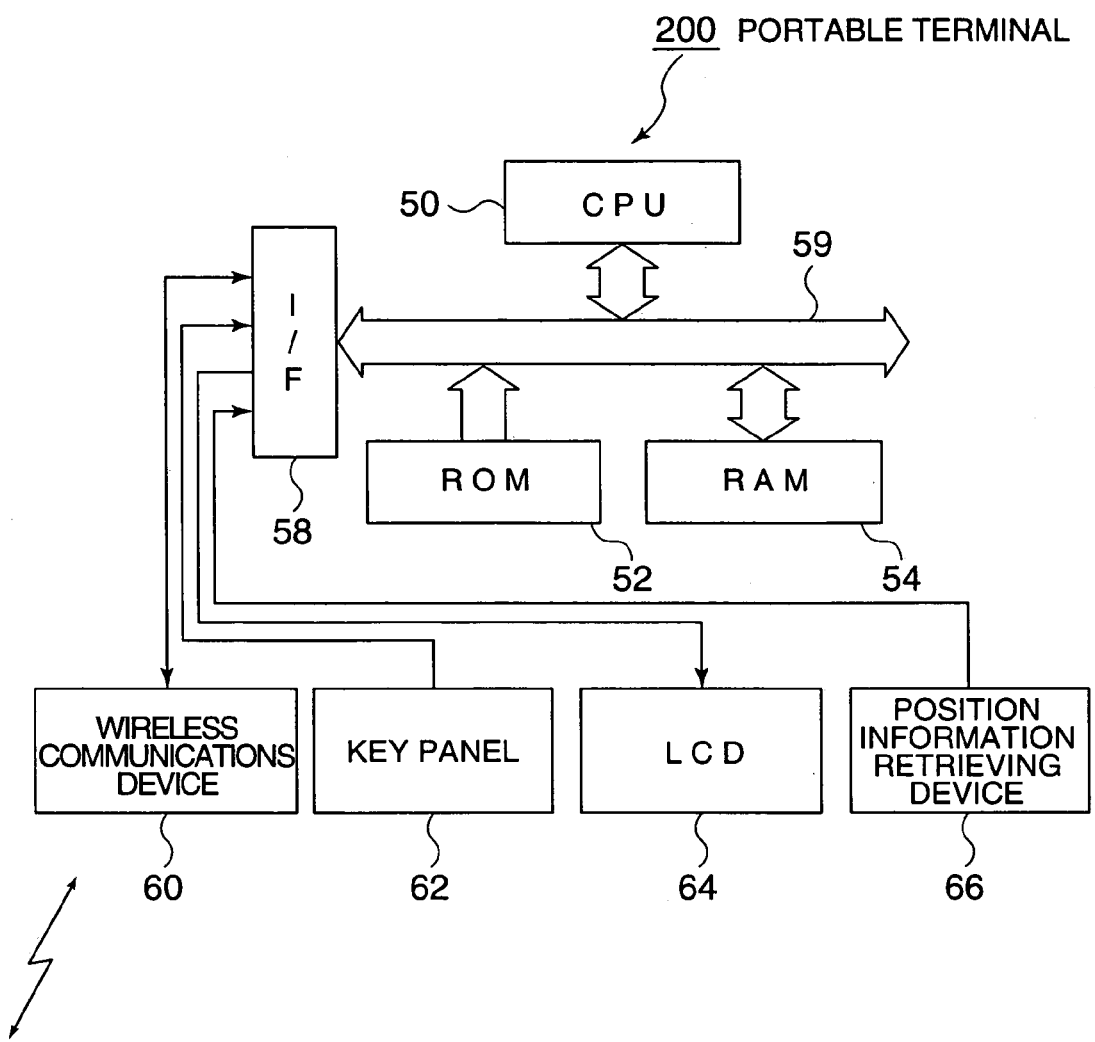
FIG. 6 is an exemplary block diagram of the structure of a portable terminal 200.

Next, the structure of the portable terminal 200 is described in detail with reference to FIG. 6. FIG. 6 is an exemplary block diagram of the structure of the portable terminal 200.

The portable terminal 200 can include a CPU 50 which controls the calculation and the overall system according to a control program, a ROM 52 which stores the control program of the CPU 50 and the like beforehand in a predetermined region, a RAM 54 which stores the data read from the ROM 52 etc., and results of the required calculation in the calculation process by the CPU 50, and an I/F 58 which intermediates the input/output of data to/from an external device. These components are connected to each other so that data can be transmitted/received through a bus 59 serving as a signal line for data transfer.

Connected to the I/F 58 are external devices including a wireless communications device 60 which performs communications to/from the base stations 210 by wireless communications, a key panel 62 which allows for data input using a plurality of keys as a human interface, an LCD (liquid crystal display) 64 for display on a screen based on an image signal, and a position information retrieving device 66 which determines the present position of the portable terminal 200 to retrieve portable terminal position information for specifying that position.

The position information retrieving device 66 receives time signals from orbiting satellites for sending a time signal indicative of the present time, so that a so-called GPS in which the position is measured on the basis of time lag indicated by the time signals and the orbits of the orbiting satellites is used to measure the position of the present point, and the measured position of the present point is output as portable terminal position information.

Figure 7:
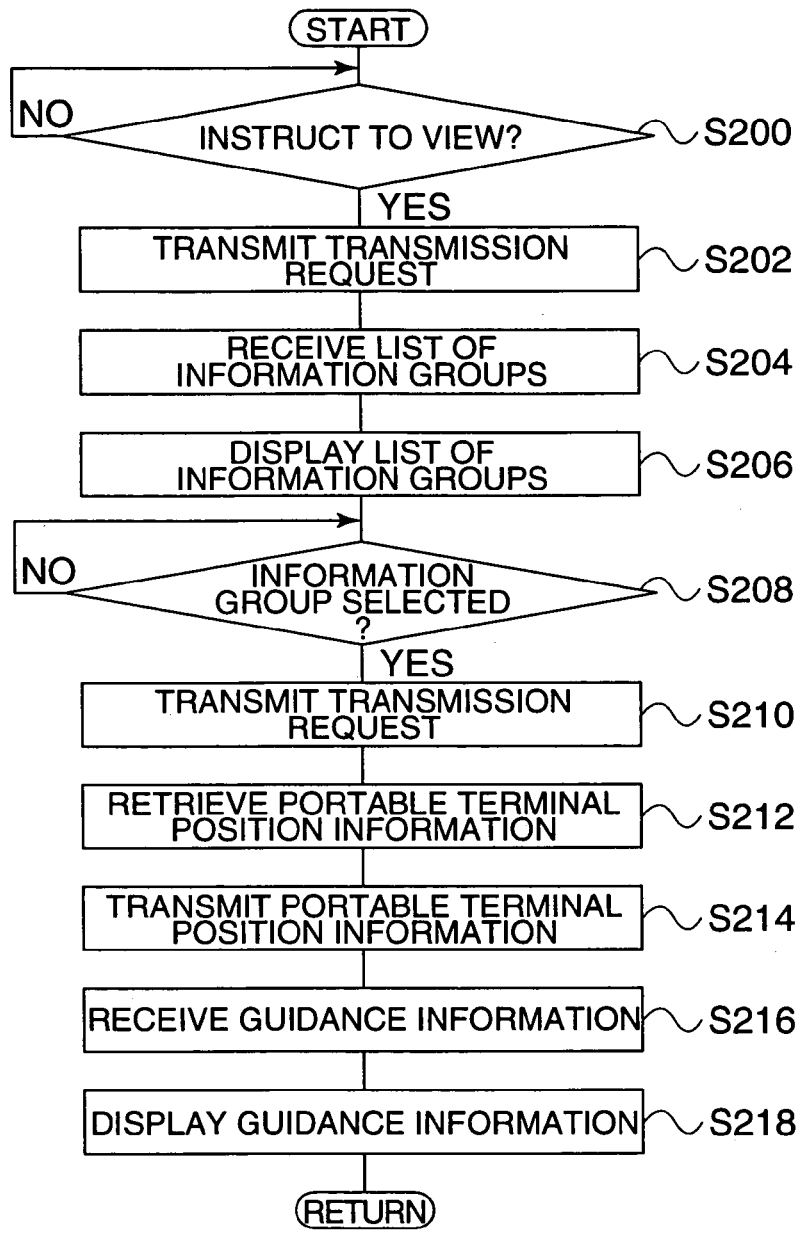
FIG. 7 is a flowchart of an exemplary guidance information displaying process.

The CPU 50, such as a micro processing unit or MPU, activates a predetermined program stored in a predetermined region of the ROM 52 to perform the guidance information displaying process shown in a flowchart of FIG. 7 according to the program. FIG. 7 is a flowchart of an exemplary guidance information displaying process.

The guidance information displaying process is a process of, in response to user's instruction, requesting the registration terminal 100 to transmit the guidance information and of displaying the guidance information which is received in response to the transmission of the transmission request. Once executed by the CPU 50, as shown in FIG. 7, the process first proceeds to step S200.

At step S200, it is determined whether or not an instruction has been made by a user of the portable terminal 200 to view the guidance information. If it is determined that the instruction has been made to view the guidance information (Yes), then the process proceeds to step S202, but if it is determined otherwise (No), then the process waits at step S200 until the instruction has been made to view the guidance information.

At step S202, a transmission request for the guidance information is transmitted to the registration terminal 100, followed by step S204, where a list of information groups is received. Then, the process proceeds to step S206, where the received list of information groups is displayed on the LCD 64, then proceeding to step S208.

At step S208, it is determined whether or not any subject to be viewed has been selected from the list of information groups. If it is determined that any has been selected from the list of information groups (Yes), then the process proceeds to step S210, where a transmission request for the guidance information based on the list of information groups is transmitted to the registration terminal 100. Then, the process proceeds to step S212.

At step S212, portable terminal position information is retrieved from the position information retrieving device 66, followed by step S214, where the retrieved portable terminal position information is transmitted to the registration terminal 100. Then, the process proceeds to step S216, where the guidance information is received, proceeding to step S218, where the received guidance information is displayed on the LCD 64. Then, the process completes the series of steps, and returns to the initial processing.

On the other hand, if it is determined at step S208 that no subject to be viewed has been selected from the list of information groups (No), then the process waits at step S208 until any has been selected from the list of information groups.

Figure 8:
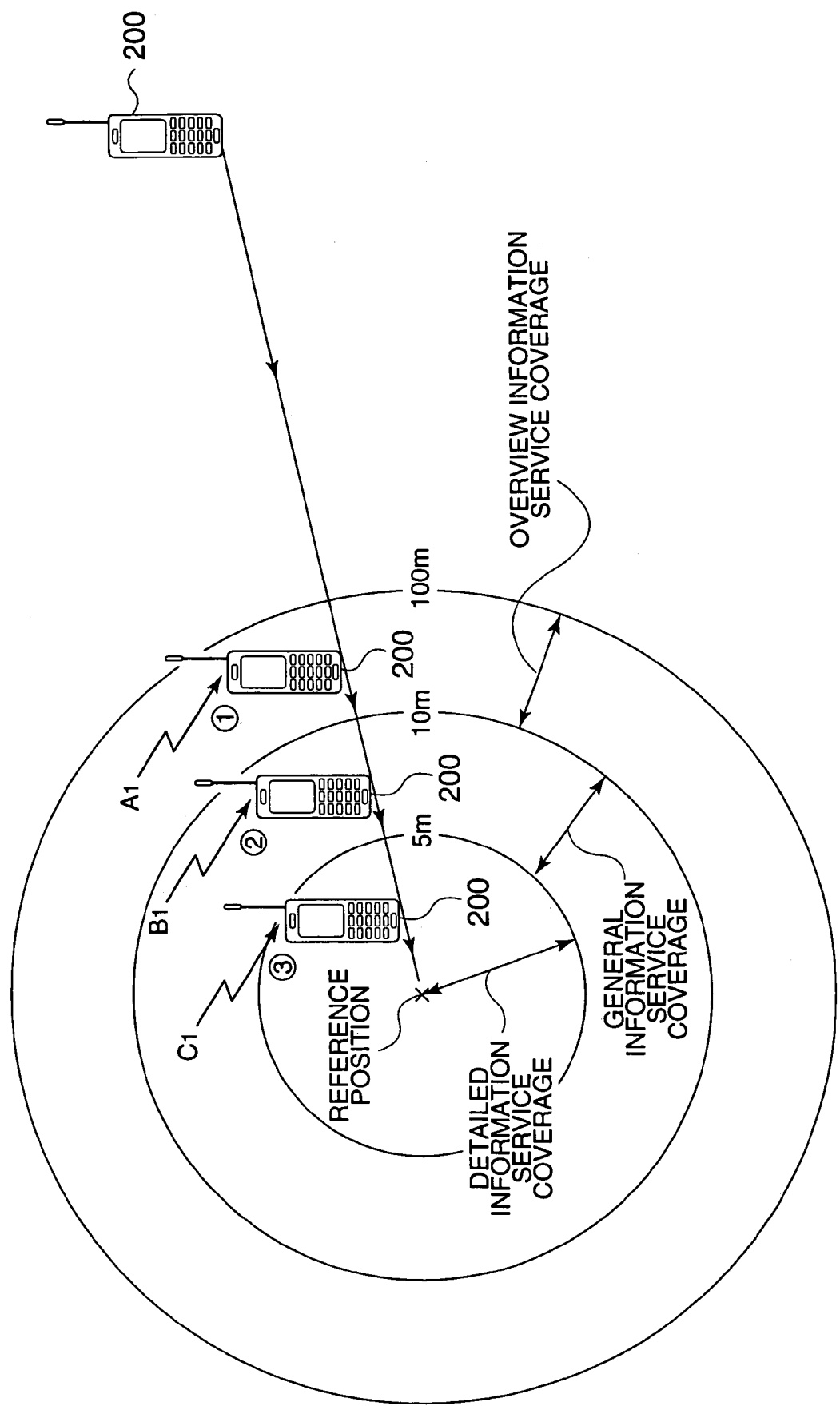
FIG. 8 is a conceptual diagram showing that the content of guidance information differs depending upon the position of a user of the portable terminal 200.

Now, operation according to the present embodiment is described with reference to FIG. 8. FIG. 8 is a conceptual view showing that the content of guidance information differs depending upon the position of a user of the portable terminal 200.

First, a reference is made to, for example, the case where a user of the portable terminal 200 desires to view guidance information "TOKYO BAKERY, SETAGAYA-KU, TOKYO" which belongs to the first information group shown in FIG. 4, in which a distance from the portable terminal 200 to the reference position is within a range of 10 to 100 m, as shown in FIG. 8 (the case in the state ① in the same figure).

To allow the user to view guidance information "TOKYO BAKERY, SETAGAYA-KU, TOKYO," first, the user instructs the portable terminal 200 to view the guidance information.

In the portable terminal 200, upon an instruction to view the guidance information, a transmission request for the guidance information is transmitted to the registration terminal 100 according to steps S200 and S202.

In the registration terminal 100, when the transmission request is received, a list of information groups is created and the resulting list of information groups is transmitted to the portable terminal 200 according to steps S100 to S104.

In the portable terminal 200, when the list of information groups is received, the list of information groups which has been received is displayed according to steps S204 and S206, and a request is made to the user to select an information group which he is to view. In response to the selection request, the user selects the information group which he desires to view. In the portable terminal 200, in response to the selection of information group, a transmission request to transmit the guidance information about the selected information group is sent to the registration terminal 100, the portable terminal position information is retrieved from the position information retrieving device 66, and the retrieved portable terminal position information is transmitted to the registration terminal 100 according to steps S208 to S214.

In the registration terminal 100, when the transmission request and the portable terminal position information is received, the reference position information corresponding to an information group in accordance with the transmission request is read according to steps S106 to S110. Since a distance from the portable terminal 200 to the reference position is within a range of 10 to 100 m, the overview information $A_1$ service coverage for the information group in accordance with the transmission request is read to determine that a distance from the position which is specified by the received portable terminal position information to the reference position which is specified by the read reference position information is within the overview information $A_1$ service coverage which has been read according to steps S112 and S114. Then, according to steps S116 and S118, the overview information $A_1$ out of the information group in accordance with the transmission request is read, and the read overview information $A_1$ is transmitted to the portable terminal 200.

In the portable terminal 200, when the overview information $A_1$ is received, the received overview information $A_1$ is displayed according to steps S216 and S218.

Therefore, if a user of the portable terminal 200 is located within a range from 10 to 100 m far from the reference position, the overview information $A_1$ is displayed on the portable terminal 200 if the user desires to view the guidance information "TOKYO BAKERY, SETAGAYA-KU, TOKYO."

Next, in the same example as above, a reference is made to the case where a user of the portable terminal 200 is closer to the reference position and a distance from the portable terminal 200 to the reference position is within a range of 5 to 10 m, as shown in FIG. 8 (the case in the state ② in the same figure).

To allow the user to view guidance information "TOKYO BAKERY, SETAGAYA-KU, TOKYO," first, the user instructs the portable terminal 200 to view the guidance information.

In the portable terminal 200, upon an instruction to view the guidance information, a transmission request for the guidance information is transmitted to the registration terminal 100.

In the registration terminal 100, when the transmission request is received, a list of information groups is created and the resulting list of information groups is transmitted to the portable terminal 200.

In the portable terminal 200, when the list of information groups is received, the list of information groups which has been received is displayed, and a request is made to the user to select an information group which the user is to view. In response to the selection request, the user selects the information group which he desires to view. In the portable terminal 200, in response to the selection of information group, a transmission request to transmit the guidance information about the selected information group is sent to the registration terminal 100, the portable terminal position information is retrieved from the position information retrieving device 66, and the retrieved portable terminal position information is transmitted to the registration terminal 100.

In the registration terminal 100, when the transmission request and the portable terminal position information are received, the reference position information corresponding to an information group in accordance with the transmission request is read. Since a distance from the portable terminal 200 to the reference position is within a range of 5 to 10 m, the general information $B_1$ service coverage for the information group in accordance with the transmission request is read to determine that a distance from the position which is specified by the received portable terminal position information to the reference position which is specified by the read reference position information is within the general information $B_1$ service coverage which has been read according to steps S120 and S122. Then, according to steps S124 and S126, the general information $B_1$ out of the information group in accordance with the transmission request is read, and the read general information $B_1$ is transmitted to the portable terminal 200.

In the portable terminal 200, when the general information $B_1$ is received, the received general information $B_1$ is displayed.

Therefore, if a user of the portable terminal 200 is located within a range from 5 to 10 m far from the reference position, the general information $B_1$ is displayed on the portable terminal 200 if the user desires to view the guidance information "TOKYO BAKERY, SETAGAYA-KU, TOKYO."

Next, in the same example as above, a reference is made to the case where a user of the portable terminal 200 is even closer to the reference position and a distance from the portable terminal 200 to the reference position is within a range of 0 to 5 m, as shown in FIG. 8 (the case in the state ③ in the same figure).

To allow the user to view guidance information "TOKYO BAKERY, SETAGAYA-KU, TOKYO," first, the user instructs the portable terminal 200 to view the guidance information.

In the portable terminal 200, upon an instruction to view the guidance information, a transmission request for the guidance information is transmitted to the registration terminal 100.

In the registration terminal 100, when the transmission request is received, a list of information groups is created and the resulting list of information groups is transmitted to the portable terminal 200.

In the portable terminal 200, when the list of information groups is received, the list of information groups which has been received is displayed, and a request is made to the user to select an information group which he is to view. In response to the selection request, the user selects the information group which the user desires to view. In the portable terminal 200, in response to the selection of information group, a transmission request to transmit the guidance information about the selected information group is sent to the registration terminal 100, the portable terminal position information is retrieved from the position information retrieving device 66, and the retrieved portable terminal position information is transmitted to the registration terminal 100.

In the registration terminal 100, when the transmission request and the portable terminal position information are received, the reference position information corresponding to an information group in accordance with the transmission request is read. Since a distance from the portable terminal 200 to the reference position is within a range of 0 to 5 m, the detailed information $C_1$ service coverage for the information group in accordance with the transmission request is read to determine that a distance from the position which is specified by the received portable terminal position information to the reference position which is specified by the read reference position information is within the detailed information $C_1$ service coverage which has been read according to steps S128 and S130. Then, according to steps S132 and S134, the detailed information $C_1$ out of the information group in accordance with the transmission request is read, and the read detailed information $C_1$ is transmitted to the portable terminal 200.

In the portable terminal 200, when the detailed information $C_1$ is received, the received detailed information $C_1$ is displayed.

Therefore, if a user of the portable terminal 200 is located within a range from 0 to 5 m far from the reference position, the detailed information $C_1$ is displayed on the portable terminal 200 if he desires to view the guidance information "TOKYO BAKERY, SETAGAYA-KU, TOKYO."

Accordingly, in the present embodiment, the registration terminal 100 includes the guidance information registration DB 42 which stores an information group, which is correlated with the reference position information. When portable terminal position information for specifying the position of the portable terminal 200 is received together with a transmission request for the guidance information, the guidance information can be selected from an information group in accordance with the received transmission request on the basis of the position relationship between the reference position which is specified by the reference position information corresponding to the information group in accordance with the received transmission request. Also, the position which is specified by the received portable terminal position information, and the selected guidance information is transmitted to the portable terminal 200. The portable terminal 200 can include the position information retrieving device 66 which retrieves portable terminal position information, in which the portable terminal position information retrieved by the position information retrieving device 66 is transmitted to the registration terminal 100 together with the transmission request.

This allows the provided guidance information content to differ depending upon the position of a user who owns the portable terminal 200, thereby providing simplified information to a user far from the reference position, while providing detailed information to a user near the reference position. Thus, proportionally appropriate information can be provided depending upon the position of a user compared to the conventional art. This may also relatively facilitate acquisition of information by the user, compared to the case where information is searched for as desired by a user on a home page on the Internet. Since the position relationship is determined on the registration terminal 100, the processing load placed on the portable terminal 200 can be minimized.

Furthermore, in the present embodiment, an information group includes an associated combination of overview information A, general information B containing more detailed content than the overview information A in addition to the overview information A, and detailed information C containing more detailed content than the general information B in addition to the general information B. The overview information A service coverage is broader than the general information B service coverage, and the general information B service coverage is broader than the detailed information C service coverage. The registration terminal 100 selects the overview information A from the information group if it is determined that a distance from the portable terminal 200 to the reference position is within the overview information A service coverage; selects the general information B from the information group if it is determined that a distance from the portable terminal 200 to the reference position is within the general information B service coverage; and selects the detailed information C from the information group if it is determined that a distance from the portable terminal 200 to the reference position is within the detailed information C service coverage.

This can provide simplified information to a user far from the reference position, while providing detailed information for a user near the reference position, thereby providing further appropriate information depending upon the position of a user. As a user is closer to the reference position, the content of the guidance information which he obtains will become more detailed, thereby reducing the possibility that the content of the guidance information which he obtains be insufficient.

Although the aforementioned embodiment is configured so that the position relationship between the portable terminal 200 and the reference position is determined on the registration terminal 100, it should be understood that the present invention is not limited thereto, and the position relationship between the portable terminal 200 and the reference position may be determined on the portable terminal 200.

In a specific form, the registration terminal 100 can include the guidance information registration DB 42 which stores an information group, which is correlated with the reference position information. When a transmission request for the guidance information is received, the reference position information corresponding to an information group in accordance with the received transmission request is transmitted to the portable terminal 200. When a result of the determination by the portable terminal 200 is received in response to the transmission of the reference position information, the guidance information is selected from the information group in accordance with the received transmission request on the basis of the received result of the determination, and the selected guidance information is transmitted to the portable terminal 200.

The portable terminal 200 can include the position information retrieving device 66 which retrieves portable terminal position information for specifying the position of the portable terminal 200. When the reference position information is received in response to the transmission of the transmission request, the position relationship is determined between the reference position which is specified by the received reference position information, and the position which is specified by the portable terminal position information retrieved by the position information retrieving device 66, and a result of the determination is transmitted to the registration terminal 100.

Thus, since the position relationship is determined on the portable terminal 200, the processing load placed on the registration terminal 100 can be reduced.

In another specific form where the position relationship between the portable terminal 200 and the reference position is determined on the portable terminal 200, the following can also be proposed.

The registration terminal 100 can include the guidance information registration DB 42 which stores an information group, which is correlated with the reference position information. When a transmission request for the guidance information is received, an information group in accordance with the received transmission request, and the reference position information corresponding thereto are transmitted to the portable device 200.

The portable terminal 200 can include the position information retrieving device 66 which retrieves portable terminal position information for specifying the position of the portable terminal 200. When the information group and the reference position information are received in response to the transmission of the transmission request, the guidance information is selected from the received information group on the basis of the position relationship between the reference position which is specified by the received reference position information, and the position which is specified by the portable terminal position information retrieved by the position information retrieving device 66.

Thus, since the position relationship is determined on the portable terminal 200, the processing load placed on the registration terminal 100 can be reduced.

Although the aforementioned embodiment is configured so that the registration terminal 100 performs the process according to a program stored in the ROM 32 to thereby select the guidance information, it should be understood that the present invention is not limited thereto. The registration terminal 100 may transmit program data stored in the ROM 32 to the portable terminal 200, while the portable terminal 200, in place of the registration terminal 100, may execute the process according to the received program data to thereby select the guidance information.

In a specific form, the registration terminal 100 can include the guidance information registration DB 42 which stores an information group, which is correlated with the reference position information, and which stores program data. When a transmission request for guidance information is received, an information group in accordance with the received transmission request, the reference position information corresponding thereto, and the program data can be transmitted to the portable terminal 200. In this regard, the program data is program data which causes the portable terminal 200 to execute the process of selecting the guidance information from the information group on the basis of the position relationship between the reference position which is specified by the reference position information, and the position which is specified by portable terminal position information for specifying the position of the portable terminal 200.

The portable terminal 200 can include the position information retrieving device 66 which retrieves the portable terminal position information. When the information group, the reference position information, and the program data are received in response to the transmission of the transmission request, the process is executed according to the received program data to select the guidance information.

This can modify the content of services only by changing the program data in the registration terminal 100 without modifying the internal setting of the portable terminal 200, thereby flexibly supporting modifications in service to some extent.

Although the aforementioned embodiment is configured so that the guidance information is registered in the guidance information registration DB 42 beforehand, it should be understood that the present invention is not limited thereto. The registration terminal 100 may be connected with an external terminal having guidance information registered therein via the Internet 199, and may retrieve the guidance information from the external terminal, so that the retrieved guidance information is stored in the guidance information registration DB 42.

In the configuration of the aforementioned embodiment, the registration terminal 100 selects the overview information A from the information group if it is determined that a distance from the portable terminal 200 to the reference position is within an overview information A service coverage; selects the general information B from the information group if it is determined that a distance from the portable terminal 200 to the reference position is within a general information B service coverage which is smaller than the overview information A service coverage; and selects the detailed information C from the information group if it is determined that a distance from the portable terminal 200 to the reference position is within a detailed information C service coverage which is smaller than the general information B service coverage. However, it should be understood that the present invention is not limited thereto, and, for example, if it is desired for a number of people from far places to visit a rural sightseeing spot, the of information content may be provided in an opposite way.

Specifically, the registration terminal 100 can select the overview information A from the information group if it is determined that a distance from the portable terminal 200 to the reference position is within an overview information A service coverage; selects the general information B from the information group if it is determined that a distance from the portable terminal 200 to the reference position is within a general information B service coverage which is greater than the overview information A service coverage; and selects the detailed information C from the information group if it is determined that a distance from the portable terminal 200 to the reference position is within a detailed information C service coverage which is greater than the general information B service coverage.

This can provide simplified information for a user near the reference position, while providing detailed information for a user far from the reference position, thereby providing proportionally appropriate information depending upon the position of a user.

The aforementioned embodiment has been described with respect to the case where the processes shown in the flowcharts shown in FIGS. 5 and 7 are performed by executing the control programs which are prestored in the ROMs 32 and 52, however, it should be understood that the present invention is not limited. From a storage medium in which a program indicating the process is stored, the program may be read into the RAM 34 or 54 where it is executed.

In this regard, the storage medium may be a semiconductor storage medium, such as a RAM or a ROM, a magnetic storage type storage medium, such as an FD or an HD, an optical read type storage medium, such as a CD, a CDV, an LD, or a DVD, or a magnetic storage type/optical read type storage medium such as an MO, and may encompass any storage medium which is a computer readable storage medium, whatever the electronic, magnetic, or optical reading method it uses.

The aforementioned embodiment has been described with respect to the case where the information providing system, registration terminal, and portable terminal according to the present invention are implemented in a network system such as the Internet 199, however, the present invention is not limited thereto. For example, they may be implemented in a so-called intranet for communications in the same manner as the Internet 199. Of course, not restrictively, they may be implemented in a network for communications in the same manner as the Internet 199, and may also be implemented in a usual network.

In the aforementioned embodiment, the information providing system, registration terminal, and portable terminal according to the present invention are implemented in such a manner that, as shown in FIG. 1, the registration terminal 100 which registers shop or sightseeing guidance information is connected to the portable terminal 200 via a network, where the guidance information is downloaded in the portable terminal 200 from the registration terminal 100. However, it should be understood that the present invention is not limited thereto, and other modifications may be made without departing from the spirit and scope of the invention.

As described above, according to an information providing system of the present invention, the content of the target information which differs depending upon the portion of a user who owns the portable terminal can be provided, thereby, for example, providing simplified information to a user far from the reference position, while providing detailed information to a user near the reference position. This achieves the advantage that proportionally appropriate information can be provided depending upon the position of a user compared to the conventional art. This also achieves the advantage that acquisition of information by the user can be relatively facilitated compared to the case where information is searched for as desired by a user on a home page on the Internet.

Furthermore, according to an information providing system of the present invention, the position relationship is determined on the registration terminal, thereby achieving the advantage that the processing load placed on the portable terminal can be reduced.

Furthermore, according to an information providing system of the present invention, the content of services can be modified only by changing the program data in the registration terminal without modifying the internal setting of the portable terminal, thereby achieving the advantage that modifications in services can be flexibly supported to some extent.

Furthermore, according to an information providing system of the present invention, simplified information can be provided for a user far from the reference position, while detailed information can be provided for a user near the reference position, thereby achieving the advantage that further appropriate information can be provided depending upon the position of a user.

Furthermore, according to an information providing system of the present invention, as a user is closer to the reference position, the content of the guidance information which he obtains will become more detailed, thereby, advantageously, reducing the possibility that the content of the guidance information which he obtains be insufficient.

According to a registration terminal of the present invention, the advantage equivalent to that of the above-described information providing system can be achieved.

Furthermore, according to a portable terminal of the present invention, the advantage equivalent to that of the above information providing system set forth in claim 3 can be achieved.

What is claimed is:

1. An information providing system comprising:
   a portable terminal that is connected with a registration terminal for registering target information that is to be used by the portable terminal, and that provides the target information in the registration terminal to the portable terminal; and
   the registration terminal being adapted to associate a plurality of different pieces of the target information with a single information group, and to register the information group, which is correlated with reference position information for specifying a reference position as a reference;
   the target information in the registration terminal being provided to the portable terminal by automatically selecting a particular one of the different pieces of the target information from the information group on the basis of the positional relationship between the reference position that is specified by the reference position information corresponding to the information group, and the portable terminal, and by transmitting the selected target information to the portable terminal,
   the registration terminal including a storage device that stores the information group, which is correlated with the reference position information, in which, when portable terminal position information for specifying the position of the portable terminal is received together with a transmission request for the target information, the target information is selected from an information group in accordance with the received transmission request based on a positional relationship between the reference position that is specified by the reference position information corresponding to the information group in accordance with the received transmission request, and the position that is specified by the received portable terminal position information, and the selected target information is transmitted to the portable terminal; and
   the portable terminal including a position information retrieving device that retrieves the portable terminal position information in which the portable terminal position information retrieved by the position information retrieving device is transmitted to the registration terminal together with the transmission request; and
   the information group including first target information and second target information having more detailed content than the first target information, which are associated with each other; and
   the selection of the target information, the first target information being selected from the information group if a distance from the reference position that is specified by the reference position information to the position that is specified by the portable terminal position information is within a first predetermined range, and the second target information is selected from the information group if a distance from the reference position that is specified by the reference position information to the position that is specified by the portable terminal position information is within a second predetermined range which is smaller than the first predetermined range.

2. The information providing system according to claim 1, the registration terminal including a storage device that stores the information group, which is correlated with the reference position information, in which, when a transmission request for the target information is received, reference position information corresponding to an information group in accordance with the received transmission request is transmitted to the portable terminal, and, when a result of determination by the portable terminal is received in response to the transmission of the reference position information, the target information is selected from an information group in accordance with the received transmission request on the basis of the received result of determination, and the selected target information is transmitted to the portable terminal; and
   the portable terminal including a position information retrieving device that retrieves portable terminal position information for specifying the position of the portable terminal, in which, when the reference position information is received in response to the transmission of the transmission request, the positional relationship between the reference position that is specified by the received reference position information, and the position that is specified by the portable terminal position information retrieved by the position information retrieving device is determined, and a result of the determination is transmitted to the registration terminal.

3. A registration terminal connected with the portable terminal in the information providing system according to claim 2,
   said registration terminal comprising a storage device that stores the information group, which is correlated with the reference position information,
   wherein, when the transmission request is received, the reference position information corresponding to an information group in accordance with the received transmission request is transmitted to the portable terminal, and, when the result of the determination is received in response to the transmission of the reference position information, the target information is selected from the information group in accordance with the received transmission request on the basis of the received result of the determination, and the selected target information is transmitted to the portable terminal.

4. A portable terminal connected with the registration terminal in the information providing system according to claim 2,
   said portable terminal comprising a position information retrieving device for retrieving the portable terminal position information,
   wherein, when the reference position information is received in response to the transmission of the transmission request, the position relationship between the reference position that is specified by the received reference position information, and the position that is specified by the portable terminal position information retrieved by the position information retrieving device is determined, and a result of the determination is transmitted to the registration terminal.

5. The information providing system according to claim 1, the registration terminal including a storage device that stores the information group, which is correlated with the reference position information, in which, when a transmission request for the target information is received, an information group in accordance with the received transmission request, and the reference position information corresponding thereto are transmitted to the portable terminal; and the portable terminal including a position information retrieving device that retrieves portable terminal position information for specifying the position of the portable terminal, in which, when the information group and the reference position information are received in response to the transmission of the transmission request, the target information is selected from the received information group based on the positional relationship between the reference position that is specified by the received reference position information, and the position that is specified by the portable terminal position information retrieved by the position information retrieving device.

6. A portable terminal connected with the registration terminal in the information providing system according to claim 5, said portable terminal comprising a position information retrieving device that retrieves the portable terminal position information, wherein, when the information group and the reference position information are received in response to the transmission of the transmission request, the target information is selected from the received information group based on the position relationship between the reference position that is specified by the received reference position information, and the position that is specified by the portable terminal position information retrieved by the position information retrieving device.

7. The information providing system according to claim 1, the registration terminal including a storage device that stores the information group, which is correlated with the reference position information, and stores program data, in which, when a transmission request for the target information is received, an information group in accordance with the received transmission request, the reference position information corresponding thereto, and program data are transmitted to the portable terminal;

the program data being program data that causes the portable terminal to execute the process of selecting the target information from the information group based on the position relationship between the reference position that is specified by the reference position information, and the position that is specified by portable terminal position information for specifying the position of the portable terminal; and the portable terminal including a position information retrieving device that retrieves the portable terminal position information, in which, when the information group, the reference position information, and the program data are received in response to the transmission of the transmission request, the process is executed according to the received program data to select the target information.

8. A registration terminal connected with the portable terminal in the information providing system according to claim 7, said registration terminal comprising a storage device that stores the information group, which is correlated with the reference position information, and that stores the program data, wherein, when the transmission request is received, an information group in accordance with the received transmission request, the reference position information corresponding thereto, and the program data are transmitted to the portable terminal.

9. The information providing system according to claim 1, the information group including first target information and second target information that includes more detailed content than the first target information in addition to the content of the first target information, which are associated with each other; and in the selection of the target information, the first target information being selected from the information group if a distance from the reference position that is specified by the reference position information to the position that is specified by the portable terminal position information is within a first predetermined range, and the second target information is selected from the information group if a distance from the reference position that is specified by the reference position information to the position that is specified by the portable terminal position information is within a second predetermined range that is smaller than the first predetermined range.

10. The information providing system according to claim 1, the registration terminal being connected with an external terminal having the target information registered therein, and including a target information retrieving device that retrieves the target information from the external terminal; and the target information retrieved by the target information retrieving device being stored in the storage device.

11. A registration terminal connected with the portable terminal in the information providing system according to claim 1, said registration terminal comprising a storage device that stores the information group, which is correlated with the reference position information, wherein, when the portable terminal position information is received together with the transmission request, the target information is selected from an information group in accordance with the received transmission request based on the position relationship between the reference position that is specified by the reference position information corresponding to the information group in accordance with the received transmission request, and the position that is specified by the received portable terminal position information, and the selected target information is transmitted to the portable terminal.

12. An information providing system comprising:

a portable terminal that is connected with a registration terminal for registering target information that is to be used by the portable terminal, and that provides the target information in the registration terminal to the portable terminal; and the registration terminal being adapted to associate a plurality of different pieces of the target information with a single information group, and to register the information group, which is correlated with reference position information for specifying a reference position as a reference;

the target information in the registration terminal being provided to the portable terminal by automatically selecting a particular one of the different pieces of the target information from the information group on the basis of the positional relationship between the reference position that is specified by the reference position information corresponding to the information group, and the portable terminal, and by transmitting the selected target information to the portable terminal, the registration terminal including a storage device that stores the information group, which is correlated with the reference position information, in which, when portable terminal position information for specifying the position of the portable terminal is received together with a transmission request for the target information, the target information is selected from an information group in accordance with the received transmission request based on a positional relationship between the reference position that is specified by the reference position information corresponding to the information group in accordance with the received transmission request, and the position that is specified by the received portable terminal position information, and the selected target information is transmitted to the portable terminal;

the information group including first target information and second target information that includes more detailed content than the first target information in addition to the content of the first target information, which are associated with each other; and in the selection of the target information, the first target information being selected from the information group if a distance from the reference position that is specified by the reference position information to the position that is specified by the portable terminal position information is within a first predetermined range, and the second target information is selected from the information group if a distance from the reference position that is specified by the reference position information to the position that is specified by the portable terminal position information is within a second predetermined range that is smaller than the first predetermined range.

13. The information providing system according to claim 12, the registration terminal including a storage device that stores the information group, which is correlated with the reference position information, in which, when a transmission request for the target information is received, reference position information corresponding to an information group in accordance with the received transmission request is transmitted to the portable terminal, and, when a result of determination by the portable terminal is received in response to the transmission of the reference position information, the target information is selected from an information group in accordance with the received transmission request on the basis of the received result of determination, and the selected target information is transmitted to the portable terminal; and the portable terminal including a position information retrieving device that retrieves portable terminal position information for specifying the position of the portable terminal, in which, when the reference position information is received in response to the transmission of the transmission request, the positional relationship between the reference position that is specified by the received reference position information, and the position that is specified by the portable terminal position information retrieved by the position information retrieving device is determined, and a result of the determination is transmitted to the registration terminal.

14. A registration terminal connected with the portable terminal in the information providing system according to claim 13, said registration terminal comprising a storage device that stores the information group, which is correlated with the reference position information, wherein, when the transmission request is received, the reference position information corresponding to an information group in accordance with the received transmission request is transmitted to the portable terminal, and, when the result of the determination is received in response to the transmission of the reference position information, the target information is selected from the information group in accordance with the received transmission request on the basis of the received result of the determination, and the selected target information is transmitted to the portable terminal.

15. A portable terminal connected with the registration terminal in the information providing system according to claim 13, said portable terminal comprising a position information retrieving device for retrieving the portable terminal position information, wherein, when the reference position information is received in response to the transmission of the transmission request, the position relationship between the reference position that is specified by the received reference position information, and the position that is specified by the portable terminal position information retrieved by the position information retrieving device is determined, and a result of the determination is transmitted to the registration terminal.

16. The information providing system according to claim 12, the registration terminal including a storage device that stores the information group, which is correlated with the reference position information, in which, when a transmission request for the target information is received, an information group in accordance with the received transmission request, and the reference position information corresponding thereto are transmitted to the portable terminal; and the portable terminal including a position information retrieving device that retrieves portable terminal position information for specifying the position of the portable terminal, in which, when the information group and the reference position information are received in response to the transmission of the transmission request, the target information is selected from the received information group based on the positional relationship between the reference position that is specified by the received reference position information, and the position that is specified by the portable terminal position information retrieved by the position information retrieving device.

17. A portable terminal connected with the registration terminal in the information providing system according to claim 14, said portable terminal comprising a position information retrieving device that retrieves the portable terminal position information, wherein, when the information group and the reference position information are received in response to the transmission of the transmission request, the target information is selected from the received information group based on the position relationship between the reference position that is specified by the received reference position information, and the position that is specified by the portable terminal position information retrieved by the position information retrieving device.

18. The information providing system according to claim 12, the registration terminal including a storage device that stores the information group, which is correlated with the reference position information, and stores program data, in which, when a transmission request for the target information is received, an information group in accordance with the received transmission request, the reference position information corresponding thereto, and program data are transmitted to the portable terminal;

the program data being program data that causes the portable terminal to execute the process of selecting the target information from the information group based on the position relationship between the reference position that is specified by the reference position information, and the position that is specified by portable terminal position information for specifying the position of the portable terminal; and the portable terminal including a position information retrieving device that retrieves the portable terminal position information, in which, when the information group, the reference position information, and the program data are received in response to the transmission of the transmission request, the process is executed according to the received program data to select the target information.

19. A registration terminal connected with the portable terminal in the information providing system according to claim 18, said registration terminal comprising a storage device that stores the information group, which is correlated with the reference position information, and that stores the program data, wherein, when the transmission request is received, an information group in accordance with the received transmission request, the reference position information corresponding thereto, and the program data are transmitted to the portable terminal.

20. The information providing system according to claim 12, the registration terminal being connected with an external terminal having the target information registered therein, and including a target information retrieving device that retrieves the target information from the external terminal; and the target information retrieved by the target information retrieving device being stored in the storage device.

21. A registration terminal connected with the portable terminal in the information providing system according to claim 12, said registration terminal comprising a storage device that stores the information group, which is correlated with the reference position information, wherein, when the portable terminal position information is received together with the transmission request, the target information is selected from an information group in accordance with the received transmission request based on the position relationship between the reference position that is specified by the reference position information corresponding to the information group in accordance with the received transmission request, and the position that is specified by the received portable terminal position information, and the selected target information is transmitted to the portable terminal.

* * * * *